Oct. 2, 1956  T. ROBINSON ET AL  2,765,429
ACTUATION OF ELECTROMAGNETIC RELAY MEANS, PARTICULARLY
FOR THE PROJECTION OF CINEMATOGRAPH FILMS
Filed Jan. 23, 1952
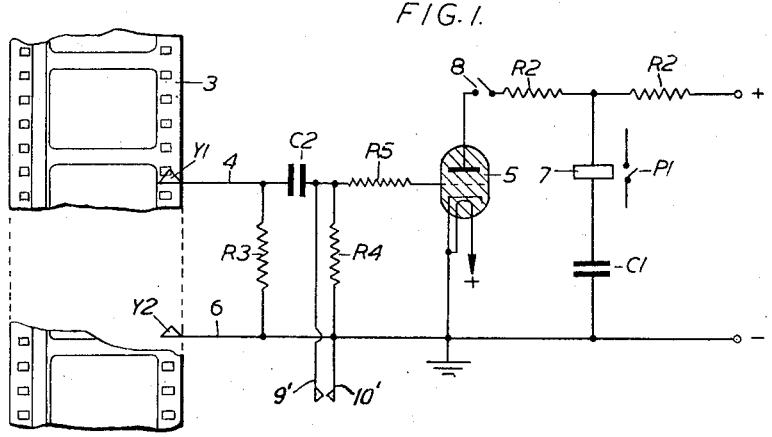
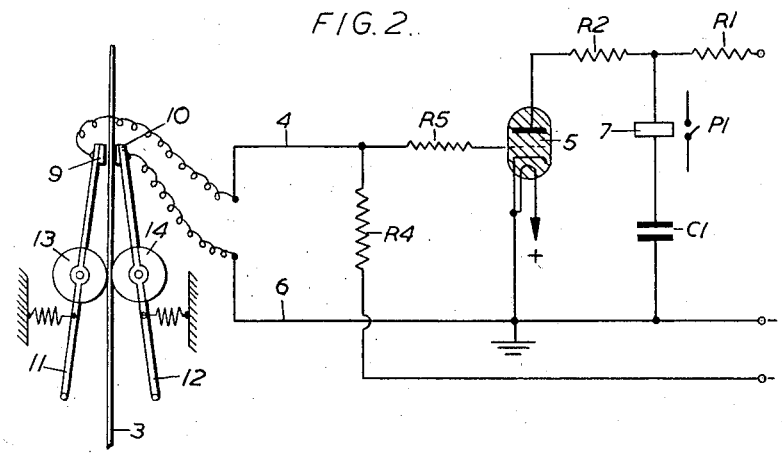
Inventors
Thomas Robinson
William James Foy
By Albert Jacobs
Attorney

United States Patent Office 2,765,429
Patented Oct. 2, 1956

2,765,429

ACTUATION OF ELECTROMAGNETIC RELAY MEANS, PARTICULARLY FOR THE PROJECTION OF CINEMATOGRAPH FILMS

Thomas Robinson, Reading, and William James Foy, Enfield, England, assignors to Essoldo Circuit (Control) Limited, Newcastle-on-Tyne, England, a British company Application January 23, 1952, Serial No. 267,783

Claims priority, application Great Britain January 26, 1951

2 Claims. (Cl. 315—349)

This invention relates to the actuation of electromagnetic relay means, particularly for the projection of cinematograph films.

A primary object of the invention is to enable automatic stopping of a film projector and extinguishing of the arc therein, immediately upon the breakage of a film in the projector or upon completion of running through of the film to the receiving spool or upon slowing down of the film to less than a predetermined speed or upon complete stoppage of same.

A further object of the invention is to facilitate change-over from one projector to another so as to afford continuous projection from a succession of film spools whether the change-over is effected manually in accordance with common practice or automatically for example as described in our co-pending application No. 267,784, filed January 23, 1952.

It is known to provide in a film projector means intended to prevent fires resulting from breaking of film in the projector. Since only the portion of film between the projection gate and the receiving spool is under tension, breakages commonly occur between the gate and said spool, so that film is left in the gate and exposed to the heat of the arc. Said known means comprise a shutter adapted to be displaced to a position between the arc and the gate so as to protect film in the gate from heat, under the operation of a centrifugal governor connected to the driving motor, and means such as a roller or equivalent running or bearing on said portion of film under tension adapted on displacement by breakage of said portion to open the motor circuit. However, since on de-energization of the motor some time elapses before the projector runs down, the intervention of the protective shutter is delayed, and ignition of the film at the gate frequently occurs.

The invention has for a further object to provide means for preventing or minimising such fires.

Accordingly, the invention provides a device comprising mutually spaced members serving as contacts adapted for engagement with a running film, web or band (hereinafter for convenience referred to as "film") and connected in the circuit of electrical means responsive to changes of electrical potential difference between said contacts, resulting from reduction from normal of the speed of the film or resulting from running out of the film (including running out as a result of breakage of the film) from between the contacts.

The invention also provides a device as aforesaid, wherein at least one of the contacts is adapted to engage in rubbing contact with the film passage of which at speed past the contacts develops a static potential which serves to control the operation of a thermionic device associated with said contact members.

The responsive device may consist, for example, of twin pick-off members which are adapted to be located in spaced relationship with one another at least one of said members being in rubbing contact with the film. The other of said members may also be in rubbing contact with the film or in the case, for example, of a cinematograph film projector, may be an existing part thereof, such as a sprocket, guide, or gate normally engaging the film. Static potential produced when the film moves at speed past the pick-off members may be utilized to control the grid bias voltage of a valve such as a thyratron valve and thereby control the valve for activation of an electrical circuit by reason of change of said potential. For example, a thyratron valve may be arranged to function upon reduction or interruption of the static potential as a result of slowing down of the film, or stoppage the same, and its operations may be utilized to effect operation of a pulse relay coil the associated contacts of which are connected in a circuit controlling the various operations to be effected, for example, in a cinematograph film projector, arc, cut-off, motor shut-down and dowser operation.

As the operation of the device according to the present invention is dependent upon the speed of the film reaching a predetermined value means are provided for completing the circuit only when such speed is attained.

The means may consist, for example, of a switch which is connected in the circuit of the thermionic valve, said switch being operable either automatically or manually to complete the valve circuit when the desired film speed is reached.

The invention alternatively provides a device as first stated in or for a cinematograph film projector wherein the contacts are adapted to close when an intervening film runs out from between them, to control the operation of a thermionic device associated with the contacts.

Such responsive device may take any of various forms. Preferably, at least one of its two members is a roller mounted to be displaceable under light resilient pressure, for example upon a pivoted arm or arms subject to a torsion spring anchored about the pivot. The roller itself may serve as one contact, or the arm or one or each of the arms on which it is mounted may carry or entrain an electric contact when the roller is moved by the spring towards the other member from which it is normally separated by the interposed film. In the latter case, the roller or other member may be made of plastic material or of insulating composition or the like, which may have less tendency to damage the film.

Relay means in circuit with said thermionic device may be arranged for extinguishing the arc and also for de-energizing the motor of the projector when the contacts close.

In the accompanying drawings we show diagrammatically two examples of a responsive device according to the present invention and circuits controlled thereby, as applied to a cinematograph film projector.

In Figure 1 of the drawings, the responsive device comprises a pair of pick-off members Y1, Y2 which are spaced apart from one another, and at least one of which is in rubbing contact with a marginal edge of a film 3. The other may also be in rubbing contact or may be an existing element of the projector such as a sprocket, guide or gate, or part thereof, normally engaging the film.

The pick-off member Y2 is connected by conductor 4 to the grid of a thyratron valve 5, and the pick-off member Y1 is connected to a common conductor 6.

Interposed in the grid circuit of valve 5 are a capacitor C2, a resistor R3 and a resistor R4, and when the film 3 travels at predetermined speed past the members Y1 and Y2 a static potential is developed across resistor R3 which potential causes an equal and opposite potential to be developed across resistor R4 by reason of the capacitor C2. This potential is applied to the grid of the thyratron valve and maintains it at or beyond cut-off and the said valve is thus prevented from operating whilst the film is running at its normal speed.

The resistance of the resistor R3 is of course chosen so that the potential between the pick-off members is of a sufficiently small value as not to cause discharge between said members or breakdown of circuit components.

Should the speed of the film drop below the predetermined rate, or if the film stops, for example as a result of a break in the film, the potential across the resistor R3 is consequently lowered whereupon the potential across resistor R4 is also lowered due to the action of the capacitor C2 and thus the bias is reduced or removed from the grid of the valve 5 which then operates.

Connected in the anode circuit of the valve 5 is a coil 7 of a pulse relay having contacts P1 which are adapted to be connected in a circuit or circuits controlling the operations to be effected. Included in the anode circuit of the valve 5 is a switch 8 the contacts of which remain open when the projector is shut down. Upon starting up, and when the film has reached the predetermined speed, the switch 8 is closed preferably automatically thereby completing the circuit between the pulse relay coil 7 and the valve 5 in readiness for operation. When the valve 5 operates, the coil 7 is energised and the contacts P1 closed or opened as desired to permit activation of a circuit or circuits controlling for example arc-shut off, motor shut down and dowser operation.

The current to the anode circuit is provided under the control of a resistor R1 and a capacitor C1, and upon operation of the valve 5 the pulse relay coil 7 will remain energised until the capacitor C1 is discharged.

Evidently, means as described may be adapted for use with running bands or webs of material other than cinematograph film, for example, of textile, plastic, paper or other webs the nature of which is such as to develop a static potential between two spaced members in rubbing contact with the web. For example, such means may serve to control the speed, as to secure constant speed of the band or web.

Referring now to Figure 2, the responsive device has pick-off members comprising a pair of contacts 9, 10 mounted on arms 11, 12, carrying respectively rollers 13, 14 which are resiliently urged into contact with opposite faces respectively of the film 3. The contact 9 is connected by conductor 4 to the grid of thyratron valve 5 and the contact 10 is connected to the common conductor 6. In this example, the resistor R4 is connected to a source of negative bias, and since the device is independent of the speed of the film, contacts are omitted.

In operation, and when the film is interposed between the rollers 13, 14, holds the contacts 9, 10 apart so that the bias potential through the resistor R4 is applied to the grid of the valve 5 thus preventing its operation. When however the film breaks or its end runs out from between the rollers, or both, the contacts become engaged together thereby removing the bias potential from the grid of the valve, thus causing the valve to operate as above described with reference to Figure 1.

Evidently, a responsive device as aforesaid is adapted to serve in an individual projector for stopping the projector and extinguishing the arc immediately on the running of the trailing end of a film from between said two pick-off members on to the receiving spool. Further, such means is adapted for preventing or minimising fires on breakage of the portion of the film extending between said members, by immediately extinguishing the arc and thereby preventing undue heating of the section of film remaining in the gate.

Moreover, means as aforesaid is adapted to facilitate change-over from one projector to another in continuous projection, by automatically stopping the outgoing projector and extinguishing the arc therein when the trailing end of the projected film runs past the responsive device.

This function is advantageous whether the change-over (i. e. the operations of striking the arc and starting the motor in the incoming projector, and switching over the sound amplification apparatus) are effected manually, in which case the operator has no need to attend immediately to the outgoing projector, or whether the change-over is effected automatically for example as described in our co-pending application No. 267,784, filed January 23, 1952.

When the invention is applied to facilitate change-over by extinguishing the arc and stopping the motor in an outgoing projector, it may be combined with means, which serve for actuating signal apparatus to warn the operator when change-over operations are required or to effect one or more of said change-over operations automatically, or both.

The latter means (which hereinafter for convenience will be termed the "signal pick-up") may be an electrical device having two spaced terminals adapted to be disposed in contact with or in proximity to a film running through a projector, and automatically responsive to the bridging of said terminals by a conductive trace on the film. According to the present invention, one of said terminals may serve as one of the two contacts in the responsive device according to the present invention (which hereinafter for convenience of description and distinction will be termed the "cut-out"). For example, one terminal of the signal pick-up may be connected to one side of a suitable power source, and the other terminal connected through a first thermionic or relay circuit with the other side of said power source, while opposite said one terminal, which also serves as one contact of the cut-out, is disposed the other contact of the cut-out which is connected through a second thermionic or relay circuit with said other side of the power source. Hence, when the two terminals of the signal pick-up are bridged by a conductive trace on passing film the first relay circuit is energised, or alternatively when the two contacts of the cut-out are permitted to engage by running out from between them of an interposed film or when the potential of the static electricity decreases or ceases to be generated consequent upon the film slowing down or stopping, the second relay circuit is energised.

Evidently, it is immaterial to the operation of the cut-out whether the terminals of the signal pick-up are located in spaced relationship transversely of the film so that each margin of the film runs in juxtaposition to one of the terminals and bridging is effected by transverse traces on the film, or so that its terminals are displaced in longitudinal relationship to one margin of the film and adapted to be bridged by conductive traces extending longitudinally of said margin.

When the terminals of the signal pick-up are conductive rollers one of said rollers may also serve as one of the rollers 13, 14, hereinbefore recited, the latter then being the actual contacts, as one of the two members of the responsive device constituting the cutout; in such the contacts 9, 10 are of course eliminated.

Evidently various modifications may be made in the construction and operation of a cut-out according to the present invention, whether in combination as above described with a signal pick-up, or independently, in which case evidently the contacts 9, 10 may be eliminated, the rollers 13, 14 serving as contacts and at least one of them being insulated.

We claim:

1. An electrical control device of the kind operable by running film and comprising a thermionic valve, a control grid, an anode and a cathode in said valve, an electrical power source, a high potential circuit connecting said anode and cathode with said power source, a responsive device in said high potential circuit, a low potential circuit connecting said grid and said cathode with said power source, and contact members in said low potential circuit adapted to engage said running film, wherein the film is made of dielectric substance and at least one of said contact members is a rubbing contact adapted to generate, by friction with the film running at normal speed, static potential difference between said two contact members and in said low potential circuit, which is tuned so that said static potential prevents discharge of the valve through the high potential circuit.

2. A device according to claim 1, having in one of said circuits a switch closable to make the thermionic device ready for operation upon the film attaining a predetermined speed.

References Cited in the file of this patent

UNITED STATES PATENTS

| | | |
|---|---|---|
| 2,447,238 | Edmonson | Aug. 17, 1948 |
| 2,509,017 | Sear | May 23, 1950 |
| 2,566,187 | Guiffida | Aug. 28, 1951 |

FOREIGN PATENTS

| | | |
|---|---|---|
| 424,220 | Great Britain | Feb. 18, 1935 |